(12) United States Patent
Sprague (10) Patent No.: US 10,710,267 B2
(45) Date of Patent: Jul. 14, 2020

(54) MITER SAW

(71) Applicant: MILWAUKEE ELECTRIC TOOL CORPORATION, Brookfield, WI (US)

(72) Inventor: Connor P. Sprague, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 101 days.

(21) Appl. No.: 16/025,349

(22) Filed: Jul. 2, 2018

(65) Prior Publication Data

US 2019/0009425 A1  Jan. 10, 2019

Related U.S. Application Data

(60) Provisional application No. 62/530,395, filed on Jul. 10, 2017.

(51) Int. Cl.
  *B27B 5/36* (2006.01)
  *B27B 5/29* (2006.01)
  *B23D 45/04* (2006.01)

(52) U.S. Cl.
  CPC ............ *B27B 5/36* (2013.01); *B23D 45/044* (2013.01); *B23D 45/048* (2013.01); *B27B 5/29* (2013.01); *Y10T 83/7693* (2015.04); *Y10T 83/7705* (2015.04); *Y10T 83/8773* (2015.04)

(58) Field of Classification Search
  CPC ............... Y10T 83/7788; Y10T 83/768; Y10T 83/7693; Y10T 83/7697; Y10T 83/7701; Y10T 83/7705; Y10T 83/8773; B27B 5/29; B27B 5/36; B27B 9/00; B27B 9/02; B23D 45/044; B23D 45/048; B23D 45/00; B23D 45/04; B23D 45/042; B23D 45/046

See application file for complete search history.

(56) References Cited

U.S. PATENT DOCUMENTS

| | | | |
|---|---|---|---|
| 4,270,427 A | 6/1981 | Colberg et al. |
| 4,276,799 A | 7/1981 | Muehling |
| 4,587,875 A | 5/1986 | Deley |
| 5,249,496 A | 10/1993 | Hirsch et al. |
| 5,425,294 A | 6/1995 | Ushiwata et al. |
| 5,437,214 A | 8/1995 | Sasaki et al. |
| 5,582,089 A | 12/1996 | Sasaki et al. |
| 5,623,860 A | 4/1997 | Schoene et al. |
| 5,660,094 A | 8/1997 | Sasaki et al. |
| 5,713,258 A | 2/1998 | Keddie |
| 5,802,943 A | 9/1998 | Brunson et al. |
| 5,819,624 A | 10/1998 | Brault et al. |

(Continued)

*Primary Examiner* — Phong H Nguyen (74) *Attorney, Agent, or Firm* — Michael Best & Friedrich LLP (57) ABSTRACT

A bevel angle lock and detent system for a miter saw includes a first locking unit fixed relative to the turntable and a second locking unit coupled to a bevel arm of the miter saw. An actuator is moveable between a first position and a second position to move the second locking unit relative to the first locking unit. In the first position, a brake member of the second locking unit is engaged with an arcuate surface of the first locking unit to lock a saw unit relative to a turntable. In the second position, the brake member is disengaged from the arcuate surface, thereby permitting pivoting movement of the saw unit, and a detent member of the second locking unit is engageable a detent aperture of the first locking unit to locate the saw unit relative to the turntable at one predetermined bevel angle.

18 Claims, 8 Drawing Sheets

(56) References Cited

U.S. PATENT DOCUMENTS

| | | |
|---|---|---|
| 5,839,339 A | 11/1998 | Sasaki et al. |
| 5,862,732 A | 1/1999 | Itzov |
| 5,862,734 A | 1/1999 | Brunson et al. |
| 5,870,938 A | 2/1999 | Brunson et al. |
| 5,897,087 A | 4/1999 | Farley |
| 5,907,987 A | 6/1999 | Stumpf et al. |
| 5,937,720 A | 8/1999 | Itzov |
| 6,016,732 A | 1/2000 | Brault et al. |
| 6,032,562 A | 3/2000 | Brunson et al. |
| 6,032,563 A | 3/2000 | Stumpf et al. |
| 6,035,754 A | 3/2000 | Stumpf et al. |
| 6,067,885 A | 5/2000 | Brunson et al. |
| 6,101,914 A | 8/2000 | Brunson et al. |
| 6,520,059 B1 | 2/2003 | Stumpf et al. |
| RE38,122 E | 5/2003 | Kondo et al. |
| 6,606,931 B1 | 8/2003 | Brunson et al. |
| 6,615,701 B2 | 9/2003 | Hollinger et al. |
| 6,631,661 B2 | 10/2003 | Brunson et al. |
| 6,662,697 B1 | 12/2003 | Chen |
| 6,758,123 B2 | 7/2004 | Svetlik et al. |
| 6,769,338 B2 | 8/2004 | Svetlik et al. |
| 6,823,765 B2 | 11/2004 | Stumpf et al. |
| 6,865,976 B2 | 3/2005 | Parks et al. |
| 6,990,883 B2 | 1/2006 | Stumpf et al. |
| 7,127,977 B2 | 10/2006 | Carroll et al. |
| 7,201,090 B2 | 4/2007 | Svetlik et al. |
| 7,311,028 B2 | 12/2007 | Garcia et al. |
| 7,337,702 B2 | 3/2008 | Parks et al. |
| 7,530,297 B2 | 5/2009 | Carroll et al. |
| 7,549,229 B2 | 6/2009 | Aoyama et al. |
| 7,574,950 B2 | 8/2009 | Hetcher et al. |
| 7,631,587 B2 | 12/2009 | Svetlik et al. |
| 7,703,366 B2 | 4/2010 | Garcia et al. |
| 7,798,041 B2 | 9/2010 | Hetcher et al. |
| 7,802,505 B2 | 9/2010 | Hetcher et al. |
| RE41,857 E | 10/2010 | Chang |
| 8,061,043 B2 | 11/2011 | Allen et al. |
| 8,061,251 B2 | 11/2011 | Hetcher et al. |
| 8,176,823 B2 | 5/2012 | Lawlor |
| 8,176,824 B2 | 5/2012 | Lawlor |
| 8,272,133 B2 | 9/2012 | Wascow |
| 8,474,358 B2 | 7/2013 | Doumani et al. |
| 8,640,346 B2 | 2/2014 | Allen et al. |
| 8,960,063 B2 | 2/2015 | Kaye, Jr. et al. |
| 9,511,428 B2 | 12/2016 | Kaye, Jr. et al. |
| 9,522,479 B2 | 12/2016 | Boehme et al. |
| 2003/0200852 A1 | 10/2003 | Romo |
| 2004/0089125 A1 | 5/2004 | Schoene et al. |
| 2004/0112190 A1 | 6/2004 | Hollis et al. |
| 2005/0247177 A1 | 11/2005 | Hetcher et al. |
| 2005/0247178 A1 | 11/2005 | Hetcher et al. |
| 2006/0162523 A1 | 7/2006 | Hetcher et al. |
| 2006/0243113 A1 | 11/2006 | Kaye, Jr. et al. |
| 2006/0249000 A1 | 11/2006 | Meredith et al. |
| 2006/0266184 A1 | 11/2006 | Hetcher et al. |
| 2007/0163410 A1 | 7/2007 | Stumpf et al. |
| 2008/0047406 A1 | 2/2008 | Hollis et al. |
| 2008/0210073 A1 | 9/2008 | Zhang |
| 2008/0276784 A1 | 11/2008 | Zhang |
| 2009/0293691 A1 | 12/2009 | Gehret |
| 2009/0301277 A1 | 12/2009 | Ipatenco et al. |
| 2013/0291699 A1 | 11/2013 | Doumani et al. |
| 2016/0318108 A1 | 11/2016 | Gonzalez et al. |

় # MITER SAW

CROSS-REFERENCE TO RELATED APPLICATIONS

This application claims priority to U.S. Provisional Patent Application No. 62/530,395 filed on Jul. 10, 2017, the entire content of which is incorporated herein by reference.

FIELD OF THE INVENTION

The present invention relates to power tools, and more particularly to miter saws.

SUMMARY OF THE INVENTION

The invention provides, in one aspect, a miter saw including a turntable, a bevel arm pivotably coupled to the turntable about a bevel axis, a saw unit supported by the bevel arm, and a bevel angle lock and detent system for holding the saw unit in a desired bevel angle relative to the turntable. The bevel angle lock and detent system includes a first locking unit fixed relative to the turntable. The first locking unit has an arcuate surface and a plurality of detent apertures. Each of the detent apertures corresponds to a predetermined bevel angle of the saw unit about the bevel axis. The bevel angle lock and detent system also includes a second locking unit coupled to the bevel arm. The second locking unit has a brake member, a detent member, and a shaft. The bevel angle lock and detent system also includes an actuator coupled to the bevel arm and engageable with the shaft. The actuator is moveable between a first position and a second position to move the second locking unit relative to the first locking unit. In the first position of the actuator, the brake member is engaged with the arcuate surface of the first locking unit to lock the saw unit relative to the turntable and prevent the saw unit from pivoting about the bevel axis. In the second position of the actuator, the brake member is disengaged from the arcuate surface, thereby permitting pivoting movement of the saw unit about the bevel axis, and the detent member is engageable with one of the detent apertures to locate the saw unit relative to the turntable at one of the predetermined bevel angles.

The invention provides, in another aspect, a miter saw includes a turntable, a bevel arm pivotably coupled to the turntable about a bevel axis, a saw unit supported by the bevel arm, and a bevel angle lock and detent system for holding the saw unit in a desired bevel angle relative to the turntable. The bevel angle lock and detent system includes a friction plate fixed relative to the turntable. The friction plate has an arcuate surface and a plurality of detent apertures. Each of the detent apertures corresponds to a predetermined bevel angle of the saw unit about the bevel axis. The bevel angle lock and detent system also includes a locking unit coupled to the bevel arm. The locking unit has a brake member, a detent member, and a shaft. The bevel angle lock and detent system further includes an actuator coupled to the bevel arm and engageable with the shaft. The actuator is moveable between a first position and a second position to move the locking unit relative to the friction plate. In the first position of the actuator, the brake member is engaged with the arcuate surface of the friction plate to lock the saw unit relative to the turntable and prevent the saw unit from pivoting about the bevel axis. In the second position of the actuator, the brake member is disengaged from the arcuate surface, thereby permitting pivoting movement of the saw unit about the bevel axis, and the detent member is engageable with one of the detent apertures to locate the saw unit relative to the turntable at one of the predetermined bevel angles.

The invention provides, in yet another aspect, a miter saw includes a turntable, a bevel arm pivotably coupled to the turntable about a bevel axis, a saw unit supported by the bevel arm, and a bevel angle lock and detent system for holding the saw unit in a desired bevel angle relative to the turntable. The bevel angle lock and detent system includes a friction plate fixed relative to the turntable. The friction plate has an arcuate surface. The bevel angle lock and detent system also includes a detent plate fixed relative to the turntable. The detent plate has a plurality of detent apertures. Each of the detent apertures corresponds to a predetermined bevel angle of the saw unit about the bevel axis. The bevel angle lock and detent system further includes a locking unit coupled to the bevel arm. The locking unit has a brake member, a detent member, and a shaft coupled to the brake member and the detent member. The bevel angle lock and detent system further includes an actuator coupled to the bevel arm and engageable with the shaft. The actuator is moveable between a first position and a second position to move the locking unit relative to the friction plate and the detent plate. In the first position of the actuator, the brake member is engaged with the arcuate surface of the friction plate to lock the saw unit relative to the turntable and prevent the saw unit from pivoting about the bevel axis. In the second position of the actuator, the brake member is disengaged from the arcuate surface, thereby permitting pivoting movement of the saw unit about the bevel axis, and the detent member is engageable with one of the detent apertures to locate the saw unit relative to the turntable at one of the predetermined bevel angles.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

DETAILED DESCRIPTION

Figure 1:
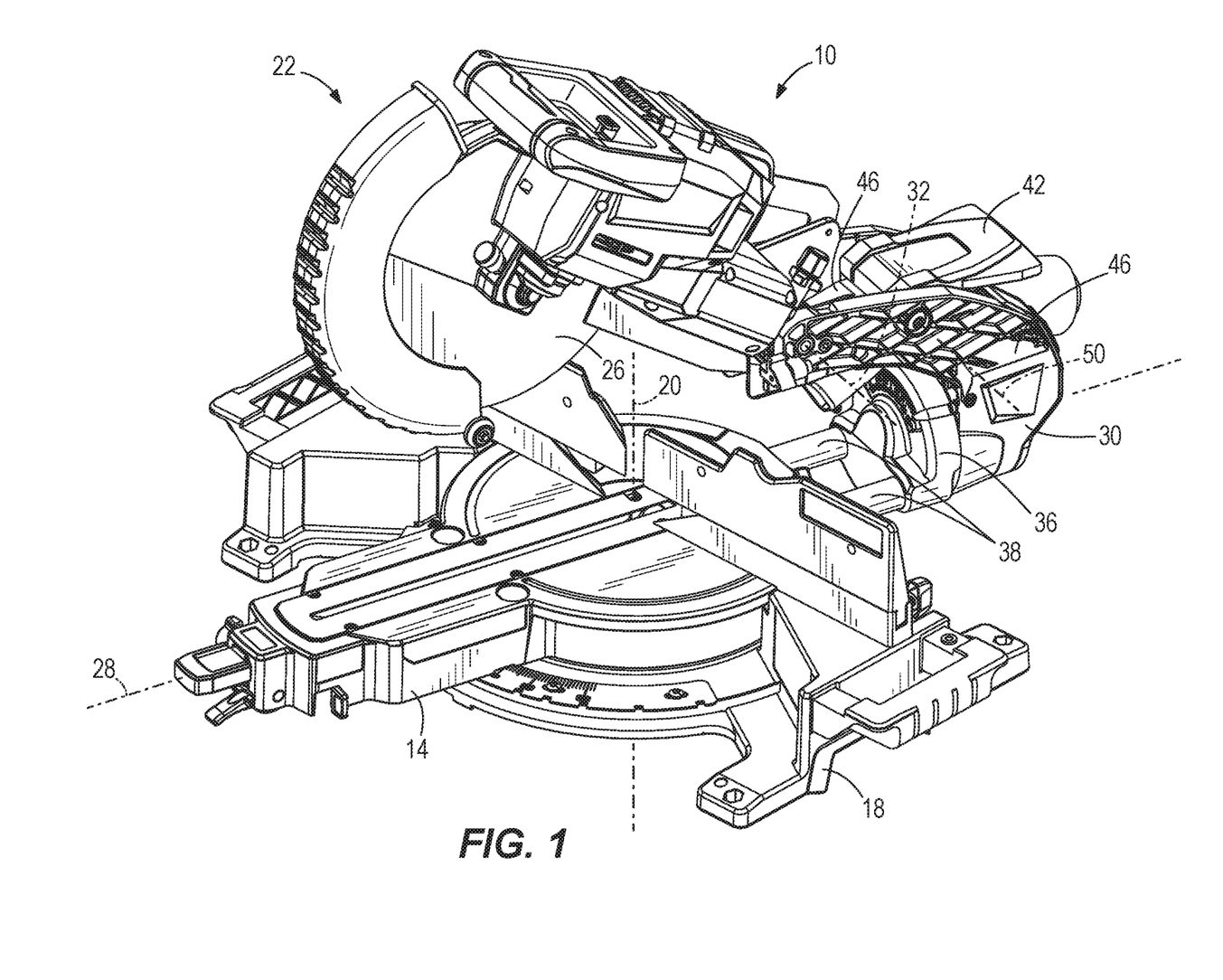
FIG. 1 is a perspective view of a miter saw.
Figure 2:
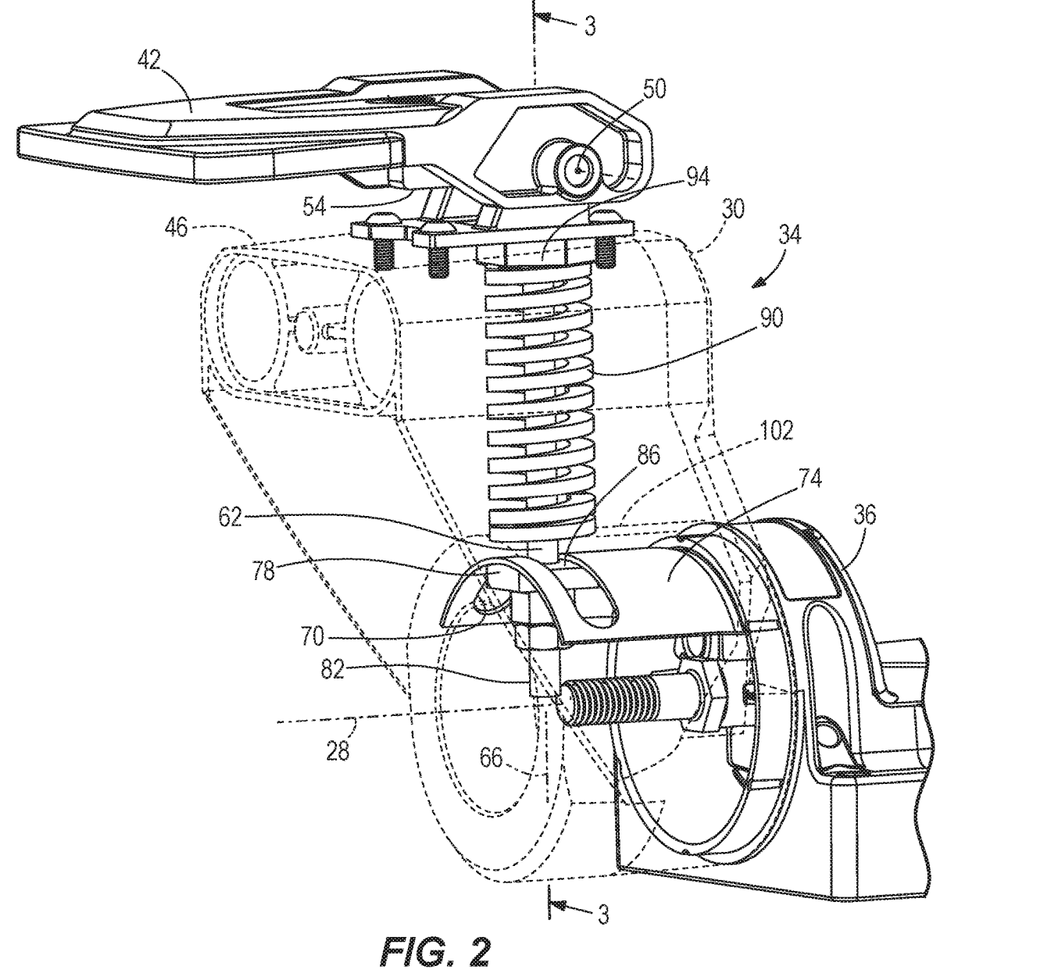
FIG. 2 is a perspective view of a bevel angle lock of the miter saw of FIG. 1 in a locked position in accordance with an embodiment of the invention.

FIGS. 1 and 2 illustrate a power tool (i.e., a miter saw 10) operable to perform two distinct cuts (e.g., a miter cut and a bevel cut) on a work piece (e.g., lumber). The illustrated miter saw 10 includes a turntable 14 that rotates relative to a base 18 about a miter axis 20 for performing the first angled cut (e.g., the miter cut). The base 18 and the turntable 14 define a support surface for the work piece to be cut. A saw unit 22, which has a saw blade 26, is pivotably coupled to the turntable 14 about a bevel axis 28 for performing the second angled cut (e.g., the bevel cut). In particular, the saw unit 22 is pivotably coupled to a bevel arm 30 about a chop axis 32 with the bevel arm 30 pivotably coupled to a bevel arm mount 36 about the bevel axis 28. The illustrated bevel arm mount 36 is coupled to the turntable 14 by a pair of sliding guide tubes 38 such that the saw unit 22 is axially moveable along the bevel axis 28 relative to the turntable 14. In other embodiments, the bevel arm mount 36 can be fixed to the turntable 14 such that the saw unit 22 cannot axially move along the bevel axis 28 relative to the turntable 14. The saw unit 22 is fixed at a desired bevel angle by a bevel angle lock 34 (FIG. 2), which clamps the bevel arm 30 against the bevel arm mount 36 on the turntable 14, as described in more detail below.

Figure 3:
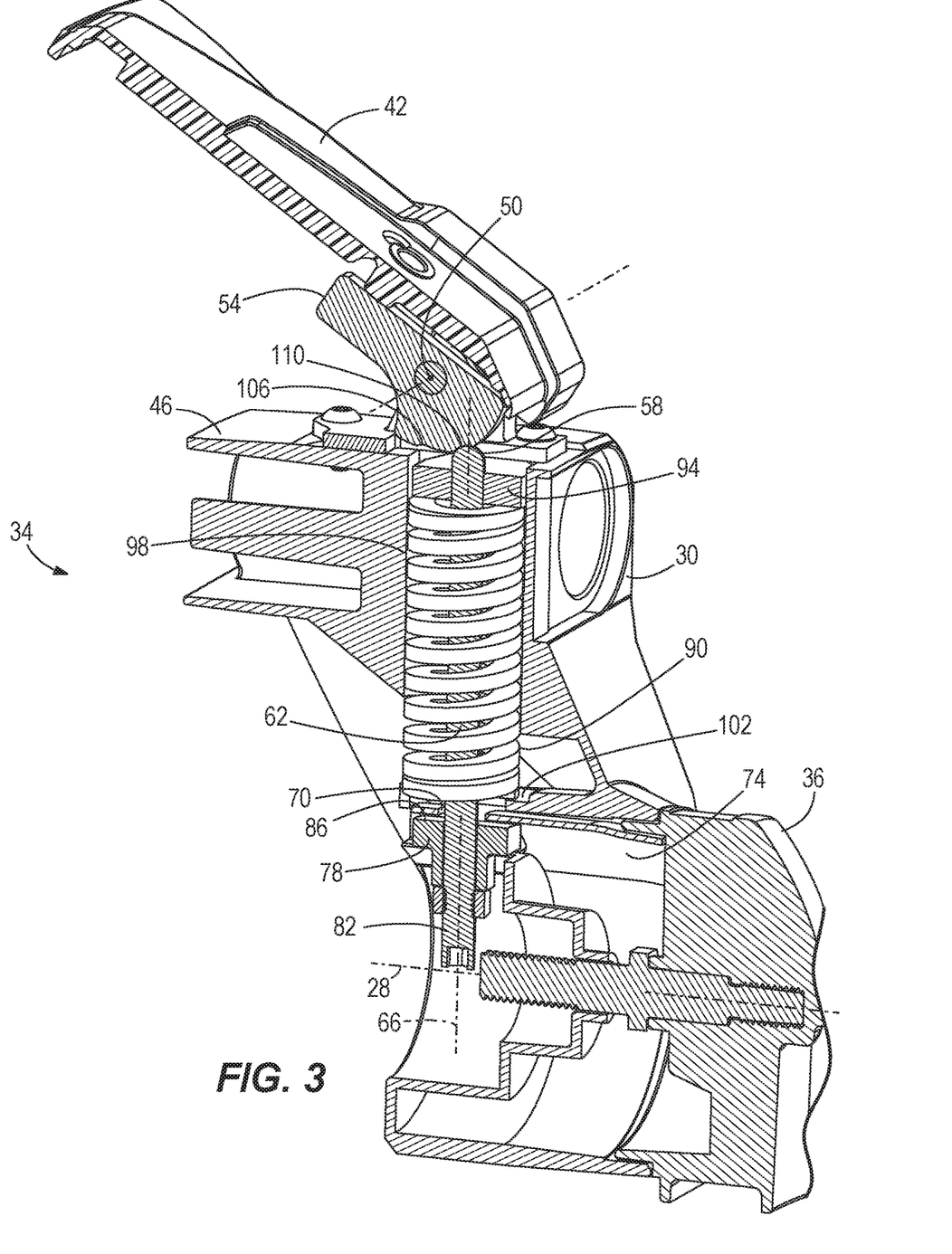
FIG. 3 is a cross-sectional view of the bevel angle lock taken along 3-3 of FIG. 2 in an unlocked position.

With reference to FIGS. 2 and 3, the bevel angle lock 34 includes an actuator 42 (e.g., a handle) pivotably coupled to a top surface 46 of the bevel arm 30 about a handle axis 50, which is spaced from and oriented perpendicular to the bevel axis 28. A cam 54 is coupled to the handle 42 for co-rotation therewith and engages an upper end 58 of a rod or shaft 62, which is oriented perpendicular to the handle axis 50. In other words, the rod 62 defines a longitudinal axis 66 that is perpendicular to both the handle axis 50 and the bevel axis 28 (i.e., the longitudinal axis 66 intersects the bevel axis 28). The rod 62 extends through a slot 70 formed in an arcuate friction plate 74 (e.g., a locking unit), which extends from the bevel arm mount 36 into the bevel arm 30. A brake member 78 is coupled to a lower end 82 of the rod 62 and includes an arcuate brake surface 86 that is engageable with the arcuate friction plate 74. The bevel angle lock 34 also includes a biasing member (e.g., a compression spring 90) coupled to the rod 62 by an anti-rotation member or nut 94 located adjacent the upper end 58 of the rod 62. In the illustrated embodiment, the rod 62, the spring 90, and the nut 94 are all received within a vertical channel 98, which is perpendicular to the bevel axis 28, having a hexagonal cross-sectional shape in the bevel arm 30. Because the nut 94 also has a hexagonal outer periphery, it is inhibited from rotating within the vertical channel 98. In another embodiment, at least one of the rod 62, the spring 90, and the vertical channel 98 can be obliquely oriented relative to the bevel axis 28 (e.g., the upper end 58 of the rod 62 can be positioned farther from the turntable 14 than the lower end 82 of the rod 62 in a direction parallel to the bevel axis 28). A lower end of the compression spring 90 is seated against a surface 102 of the bevel arm 30 so that the compression spring 90 biases the rod 62—and ultimately the brake member 78—upwardly toward the cam 54 in a direction along the longitudinal axis 66. The combination of at least the brake member 78 and the rod 62 can be referred to as a locking unit.

In operation of the bevel angle lock 34, the handle 42 is moveable between a locked position (FIG. 2) and an unlocked position (FIG. 3). In the locked position, the upper end 58 of the rod 62 is received within a first detent 106 of the cam 54. As a result, the compression spring 90 is allowed to bias the brake member 78 into engagement with the arcuate friction plate 74 to provide a frictional clamping force between the arcuate brake surface 86 and the arcuate friction plate 74 that prevents pivoting movement of the bevel arm 30—and ultimately the saw unit 22—relative to the turntable 14 about the bevel axis 28. Furthermore, the frictional force between the arcuate brake surface 86 and the arcuate friction plate 74 is adjustable by rotating the rod 62, which moves the nut 94 in a direction along the longitudinal axis 66 to change the biasing force or preload of the compression spring 90. For example, upon rotating the rod 62 in a first direction, the nut 94 will translate downwardly toward the brake member 78 to compress the compression spring 90 and increase the biasing force. In contrast, upon rotating the rod 62 in a second direction, the nut 94 will translate upwardly away from the brake member 78 to decompress the compression spring 90 and decrease the biasing force.

In the unlocked position of the handle 42 (FIG. 3), the upper end 58 of the rod 62 is received within a second detent 110 of the cam 54. As a result, the cam 54 pushes the rod 62 against the biasing force of the compression spring 90 so that the brake member 78 disengages the arcuate friction plate 74. Thereafter, the bevel arm 30—and ultimately the saw unit 22—are allowed to pivot freely about the bevel axis 28.

Figure 4:
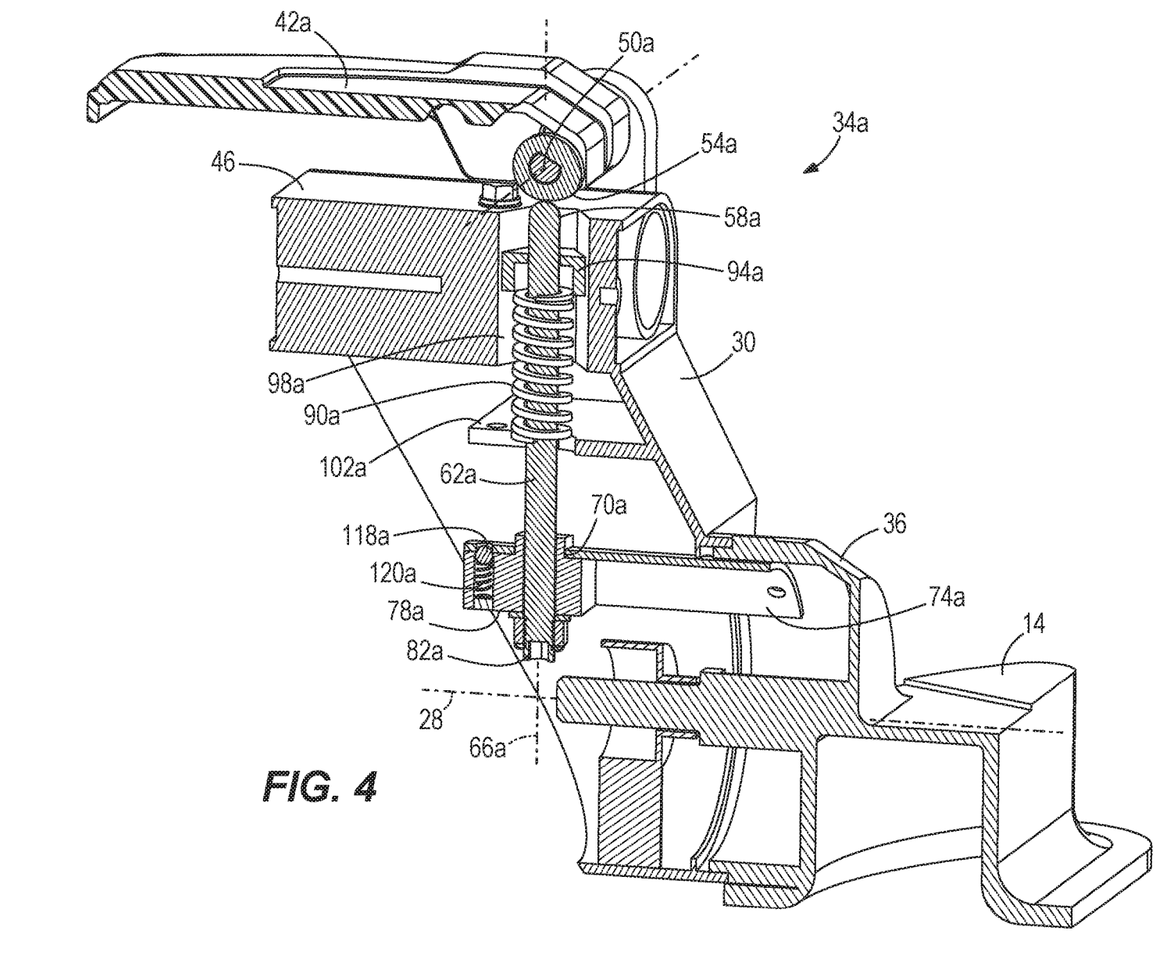
FIG. 4 is a cross-sectional view of a portion of a miter saw including a bevel angle lock and detent system in accordance with another embodiment of the invention.
Figure 5:
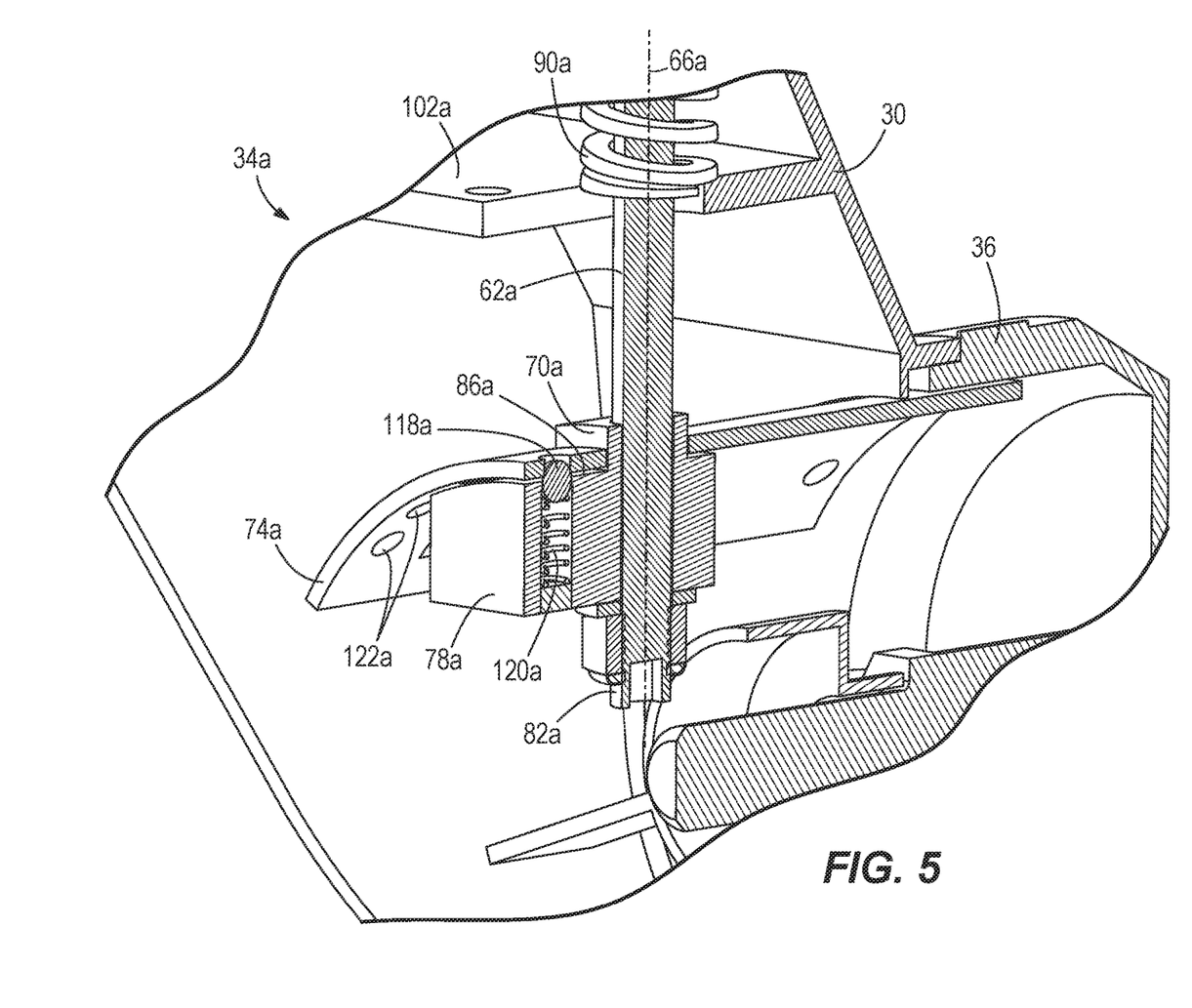
FIG. 5 is an enlarged view of a portion of the bevel angle lock and detent system of FIG. 4.

FIGS. 4 and 5 illustrate a bevel angle lock and detent system 34a for the miter saw 10 in accordance with another embodiment of the invention. The bevel angle lock and detent system 34a is similar to the bevel angle lock 34 of FIGS. 2 and 3; therefore, like components have been given like reference numbers plus the letter "a" and at least some differences and/or at least some similarities between the bevel angle lock and detent system 34a and the bevel angle lock 34 will be discussed in detail. In addition, the components or features described with respect to the bevel angle lock 34 are equally applicable to components or features described with respect to the bevel angle lock and detent system 34a.

The bevel angle lock and detent system 34a includes a handle 42a having a handle axis 50a, a cam 54a engaging an upper end 58a of a rod 62a having a longitudinal axis 66a, an arcuate friction plate 74a having a slot 70a, and a compression spring 90a coupled to the rod 62a by a nut 94a. The rod 62a, the compression spring 90a, and the nut 94a are at least partially received within a vertical channel 98a formed in the bevel arm 30 with the compression spring 90a being seated on a surface 102a of the bevel arm 30. With reference to FIG. 5, a brake member 78a, which is coupled to a lower end 82a of the rod 62a, includes an arcuate brake surface 86a and a detent 118a (e.g., a ball detent) that is biased toward the arcuate friction plate 74a by a biasing member (e.g., coil spring 120a). The ball detent 118a is selectively received in one of a plurality of recesses or apertures 122a formed in the arcuate friction plate 74a that correspond to predetermined bevel angles commonly used for cutting work pieces. In the illustrated embodiment, the combination of at least the brake member 78a, the rod 62a, and the detent 118a can be referred to as one locking unit, and the combination of at least the arcuate friction plate 74*a* and the plurality of apertures 122*a* can be referred to as another locking unit.

The bevel lock and detent system 34*a* is adjustable between three states including a fully locked state (FIG. 4), an unlocked state in which the detent 118*a* is operable (FIG. 5), and a bevel angle detent override state (not shown). In the fully locked state (e.g., similar to the locked position of the handle 42 of the bevel angle lock 34), the compression spring 90*a* biases the rod 62*a* and the brake member 78*a* upwardly so that the arcuate brake surface 86*a* of the brake member 78*a* contacts an underside of the arcuate friction plate 74*a* to apply a clamping force to the friction plate 74*a*. In addition, the coil spring 120*a* biases the detent 118*a* into engagement with a portion of the arcuate friction plate 74*a* (e.g., one of the apertures 122*a* or the underside of the arcuate friction plate 74*a*) in the fully locked state. In other words, in the fully locked state, pivoting movement of the bevel arm 30—and ultimately the saw unit 22—relative to the turntable 14 about the bevel axis 28 is prevented.

In the unlocked state in which the detent 118*a* is operable (FIG. 5), the handle 42 is rotated from the locked position, causing the cam 54*a* to engage the rod 62*a* and displace it downwardly against the bias of the compression spring 90*a*. The brake member 78*a* is also displaced from the arcuate friction plate 74*a*, releasing the clamping force applied to the bevel arm 30. But, in this state, the detent 118*a* is capable of protruding far enough from the arcuate brake surface 86*a* of the brake member 78*a* to be received in any of the apertures 122*a* in the arcuate friction plate 74*a*, allowing the bevel angle of the bevel arm 30 to be selectively adjusted between commonly used bevel angle positions. In other words, the coil spring 120*a* continues to bias the detent 118*a* into engagement with a portion of the arcuate friction plate 74*a* in the unlocked state allowing the bevel arm 30 to rotate relative to the turntable 14 about the bevel axis 28 until the detent 118*a* is received within one of the apertures 122*a*. For example, the bevel arm 30 is freely pivotable between the predetermined detent apertures 122*a* in the unlocked state. Once the detent 118*a* engages an aperture 122*a*, the engagement therebetween locates the bevel arm 30 in the desired bevel angle position until a relatively small force or moment is applied to the bevel arm 30 (via the saw unit 22) about the bevel axis 28, which then removes the detent 118*a* from one of the detent apertures 122*a* for positioning in another of the detent apertures 122*a*. The tactile sensation felt by the user of the detent 118*a* moving into and out of the detent apertures 122*a* indicates to the user that the saw unit 22 has passed through one of the predefined bevel angles coinciding with the detent apertures 122*a*. Once the desired bevel angle is reached that corresponds to the detent 118*a* being located within one of the detent apertures 122*a*, the saw unit 22 can be locked at the desired bevel angle by rotating the handle 42*a* back into the position illustrated in FIG. 4 for the brake member 78*a* to engage the arcuate friction plate 74*a*.

In the bevel angle detent override state (e.g., similar to the unlocked position of the handle 42 of the bevel angle lock 34), the handle 42 is further rotated from the unlocked state, further displacing the rod 62*a*, brake member 78*a*, and detent 118*a* downwardly to an extent where the detent 118*a* is removed from and no longer is capable of being received in the apertures 122*a*, allowing the bevel arm 30 to be freely adjusted without stopping at any of the common bevel angles associated with the apertures 122*a* (e.g., the detent 118*a* bypasses the detent apertures 122*a* such that the user does not feel tactical indications coinciding with the predetermined bevel angles). Although no longer in contact with the friction plate 74*a* in this state, the detent 118*a* remains within the brake member 78*a* and only protrudes from the brake member 78*a* far enough to reengage one of the apertures 122*a* when the handle 42 is rotated back into the unlocked state.

Figure 6:
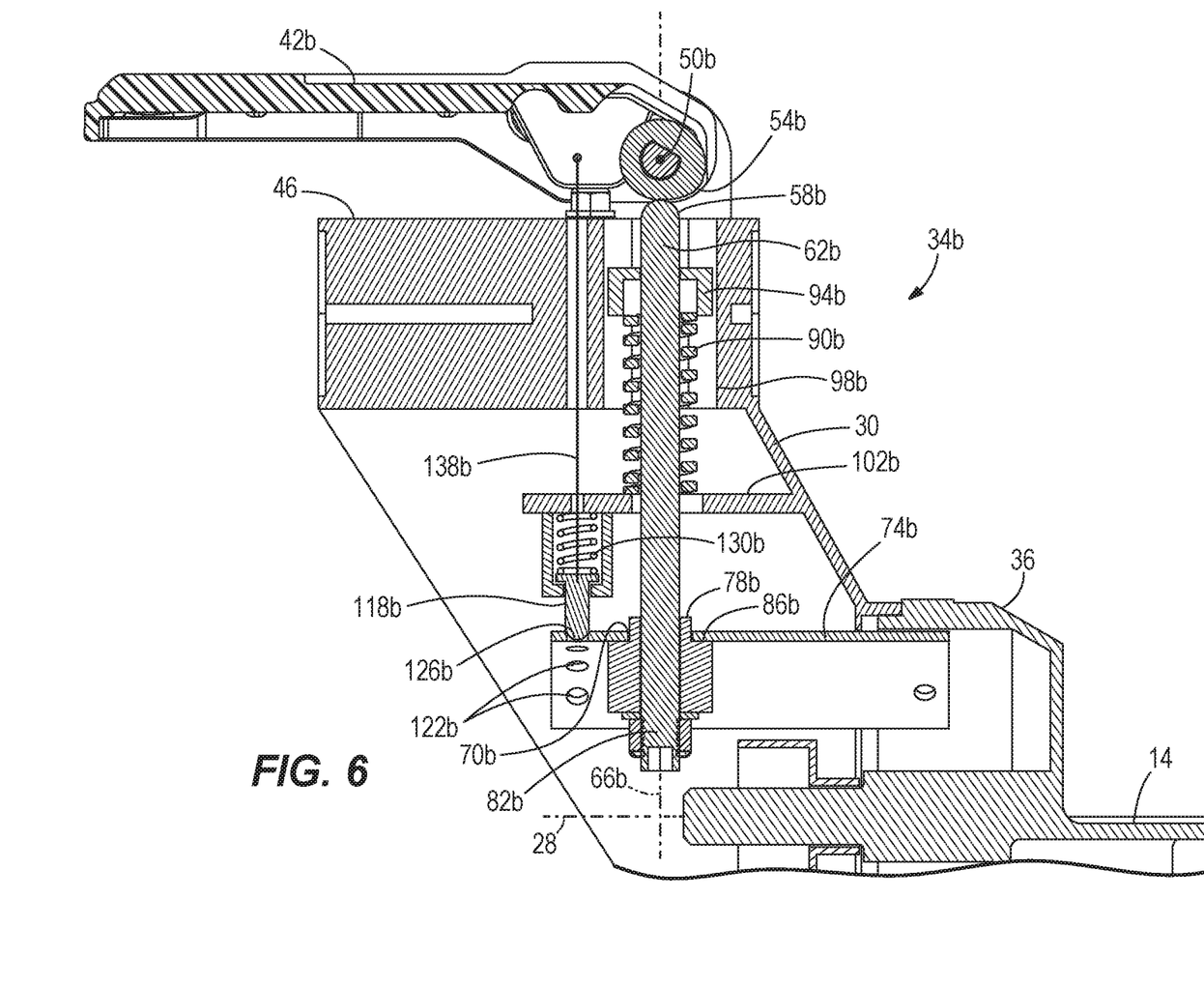
FIG. 6 is a cross-sectional view of a portion of a miter saw including a bevel angle lock and detent system in accordance with another embodiment of the invention.

FIG. 6 illustrates a bevel angle lock and detent system 34*b* for the miter saw 10 in accordance with another embodiment of the invention. The bevel angle lock and detent system 34*b* is similar to the bevel angle lock and detent system 34*a* of FIGS. 4 and 5; therefore, like components have been given like reference numbers plus the letter "b" and at least some differences and/or some similarities between the bevel angle lock and detent systems 34*a*, 34*b* will be discussed in detail. In addition, the components or features described with respect to the bevel angle lock 34 and the bevel angle lock and detent system 34*a* are equally applicable to components or features described with respect to the bevel angle lock and detent system 34*b*.

The bevel angle lock and detent system 34*b* includes a handle 42*b* having a handle axis 50*b*, a cam 54*b* engaging an upper end 58*b* of a rod 62*b* having a longitudinal axis 66*b*, an arcuate friction plate 74*b* having a slot 70*b* and a plurality of apertures 122*b*, a compression spring 90*b* coupled to the rod 62*b* by a nut 94*b*, and a brake member 78*b* having an arcuate brake surface 86*b* coupled to a lower end 82*b* of the rod 62*b*. The rod 62*b*, the compression spring 90*b*, and the nut 94*b* are at least partially received within a vertical channel 98*b* formed in the bevel arm 30 with the compression spring 90*b* being seated on a surface 102*b* of the bevel arm 30. The bevel angle lock and detent system 34*b* also includes a detent 118*b* (e.g., a detent pin/plunger) having a tip 126*b* receivable in any of the apertures 122*b* in the arcuate friction plate 74*b*, a biasing member (e.g., a coil spring 130*b*) that biases the detent tip 126*b* toward the arcuate friction plate 74*b*, and a cable 138*b* interconnecting an opposite end of the detent 118*b* with the handle 42 rearward of the handle axis 50*b*. In the illustrated embodiment, the combination of at least the brake member 78*b*, the rod 62*b*, and the detent 118*b* can be referred to as one locking unit, and the combination of at least the arcuate friction plate 74*b* and the plurality of apertures 122*b* can be referred to as another locking unit.

When in the fully locked state (FIG. 6), the arcuate brake surface 86*b* of the brake member 78*b* engages the arcuate friction plate 74*b* to apply a clamping force to the friction plate 74*b*. In addition, the coil spring 130*b* biases the detent 118*b* toward the arcuate friction plate 74*b* for the tip 126*b* to engage an upper surface of the arcuate friction plate 74*b* or to be received through one of the apertures 122*b* (if the tip 126*b* aligns with one of the apertures 122*b*).

When in the unlocked state (not shown), the handle 42*b* is rotated upwardly so that the rod 62*b* and the brake member 78*b* are displaced downwardly for the arcuate brake surface 86*b* of the brake member 78*b* to disengage from the arcuate friction plate 74*b*. In addition, the cable 138*b* moves the detent 118*b* upwardly against the biasing force of the coil spring 130*b* as the handle 42 rotates into the unlocked state. As a result, the detent 118*b* moves away from the arcuate friction plate 74*b*. However, the cable 138*b* is sized so that the tip 126*b* can still be biased into one of the apertures 122*b* when the handle 42*b* is in the unlocked state for the saw unit 22 to be locked into a predetermined angle. Once the desired bevel angle is reached that corresponds to the detent 118*b* being located within one of the detent apertures 122*b*, the saw unit 22 can be locked at the desired bevel angle by rotating the handle 42*b* back into the position illustrated in FIG. 6 for the brake member 78*b* to engage the arcuate friction plate 74b. In other embodiments, the cable 138b can include enough slack such that the detent 118b does not move when the handle 42b is rotated from the fully locked state to the unlocked state.

When in the bevel angle detent override state (not shown), the handle 42 is further rotated upwardly so that the rod 62b and the brake member 78b are displaced downwardly for the arcuate brake surface 86b of the brake member 78b to disengage from the arcuate friction plate 74b. In addition, the cable 138b further moves the detent 118b upwardly against the biasing force of the coil spring 130b so that the tip 126b moves out of engagement with the arcuate friction plate 74b. As such, the saw unit 22 can freely rotate about the bevel axis 28.

Figure 7:
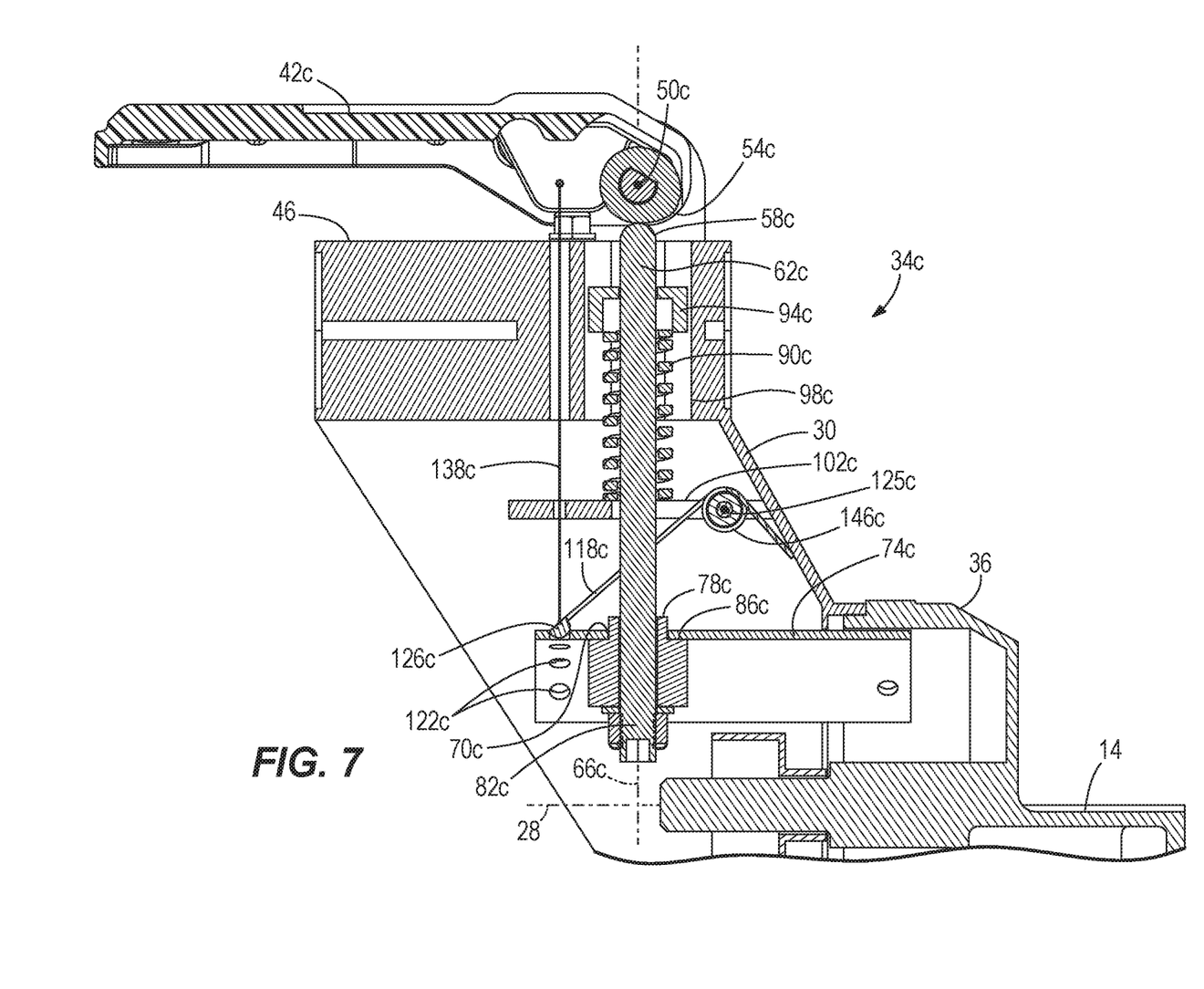
FIG. 7 is a cross-sectional view of a portion of a miter saw including a bevel angle lock and detent system in accordance with another embodiment of the invention.

FIG. 7 illustrates a bevel angle lock and detent system 34c for the miter saw 10 in accordance with another embodiment of the invention. The bevel angle lock and detent system 34c is similar to the bevel angle lock and detent system 34b of FIG. 6; therefore, like components have been given like reference numbers plus the letter "c" and at least some differences and/or some similarities between the bevel angle lock and detent systems 34b, 34c will be discussed in detail. In addition, the components or features described with respect to the bevel angle lock 34 and the bevel angle lock and detent systems 34a, 34b are equally applicable to components or features described with respect to the bevel angle lock and detent system 34c.

The bevel angle lock and detent system 34c includes a handle 42c having a handle axis 50c, a cam 54c engaging an upper end 58c of a rod 62c having a longitudinal axis 66c, an arcuate friction plate 74c having a slot 70c and a plurality of apertures 122c, a compression spring 90c coupled to the rod 62c by a nut 94c, and a brake member 78c having an arcuate brake surface 86c coupled to a lower end 82c of the rod 62c. The rod 62c, the compression spring 90c, and the nut 94c are at least partially received within a vertical channel 98c formed in the bevel arm 30 with the compression spring 90c being seated on a surface 102c of the bevel arm 30. The bevel angle lock and detent system 34c also includes a detent 118c (e.g., a detent arm) pivotably coupled to the bevel arm 30 about an axis 125c and having a tip 126c receivable in any of the apertures 122c in the arcuate friction plate 74c, a biasing member (e.g., a torsional spring 146c) that biases the detent tip 126c toward the arcuate friction plate 74c, and a cable 138c interconnecting an opposite end of the detent 118c with the handle 42c rearward of the handle axis 50c. In other embodiments, the detent 118c and the torsional spring 146c can be formed as one component. In the illustrated embodiment, the combination of at least the brake member 78c, the rod 62c, and the detent 118c can be referred to as one locking unit, and the combination of at least the arcuate friction plate 74c and the plurality of apertures 122c can be referred to as another locking unit.

When in the fully locked state (FIG. 7), the arcuate brake surface 86c of the brake member 78c engages the arcuate friction plate 74c to apply a clamping force to the friction plate 74c. In addition, the cable 138c is sized to allow for the torsional spring 146c to bias the detent 118c toward the arcuate friction plate 74c for the tip 126c to engage an upper surface of the arcuate friction plate 74c or to be received through one of the apertures 122c (if the tip 126c aligns with one of the apertures 122c).

When in the unlocked state (not shown), the brake member 78c disengages from the arcuate friction plate 74c. The cable 138c includes enough slack to allow for the torsional spring 146c to continue to bias the detent 118c toward the arcuate friction plate 74c so that the tip 126c can is still be biased into one of the apertures 122c when the handle 42 is in the unlocked state for the saw unit 22 to be locked into a predetermined angle. Once the desired bevel angle is reached that corresponds to the detent 118c being located within one of the detent apertures 122c, the saw unit 22 can be locked at the desired bevel angle by rotating the handle 42c back into the position illustrated in FIG. 7 for the brake member 78c to engage the arcuate friction plate 74c.

When in the bevel angle detent override state (not shown), the brake member 78c remains disengaged from the arcuate friction plate 74c. In addition, the cable 138c moves the detent 118c against the bias of the torsional spring 146c so that the tip 126c moves out of engagement with the arcuate friction plate 74c. As such, the saw unit 22 can freely rotate about the bevel axis 28.

Figure 8:
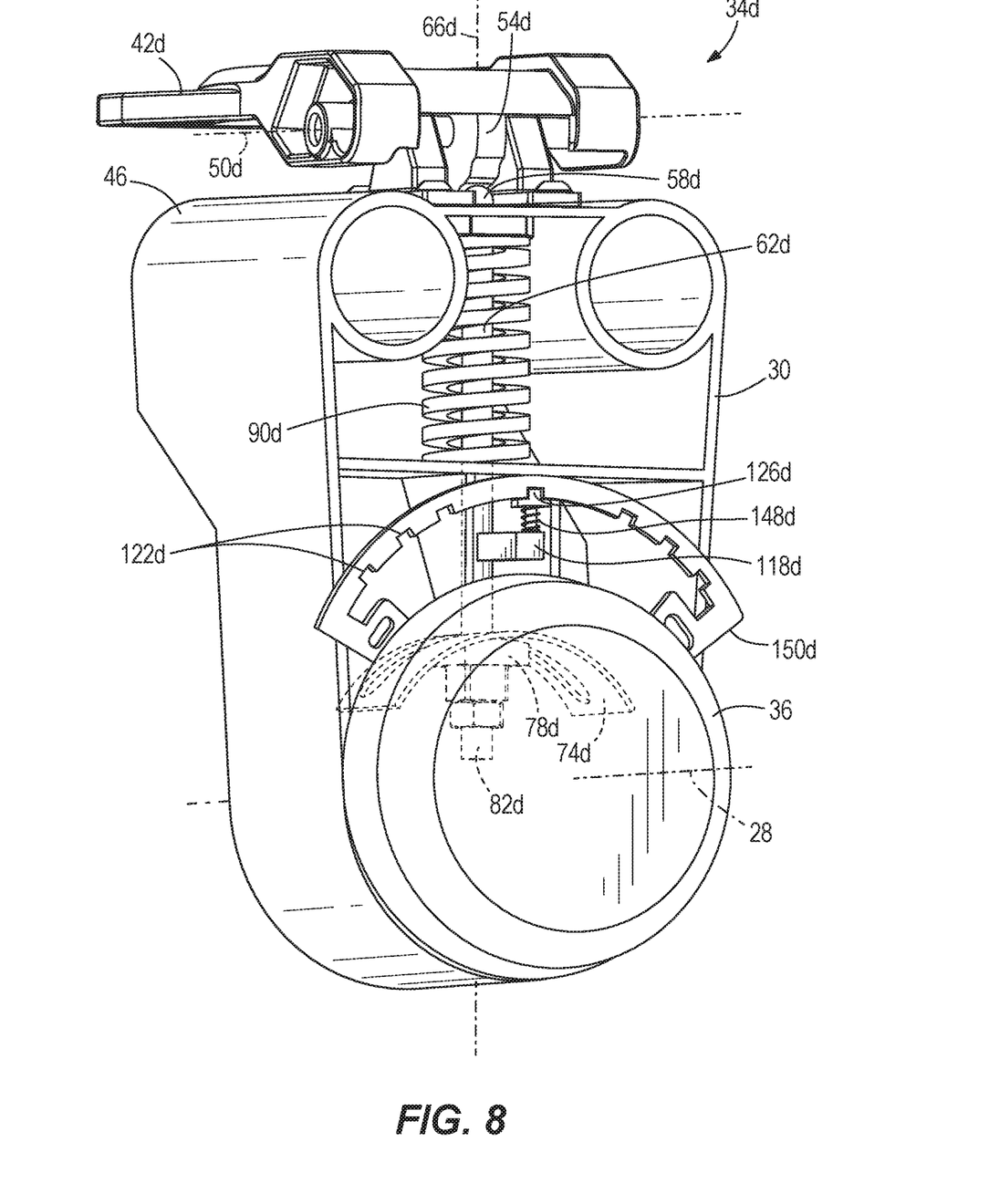
FIG. 8 is a perspective view of a portion of a miter saw including a bevel angle lock and detent system in accordance with another embodiment of the invention.

FIG. 8 illustrates a bevel angle lock and detent system 34d for the miter saw 10 in accordance with another embodiment of the invention. The bevel angle lock and detent system 34d is similar to the bevel angle lock and detent system 34c of FIG. 6; therefore, like components have been given like reference numbers plus the letter "d" and at least some differences and/or some similarities between the bevel angle lock and detent systems 34b, 34d will be discussed in detail. In addition, the components or features described with respect to the bevel angle lock 34 and the bevel angle lock and detent systems 34a, 34b, 34c are equally applicable to components or features described with respect to the bevel angle lock and detent system 34d.

The bevel angle lock and detent system 34d includes a handle 42d having a handle axis 50d, a cam 54d engaging an upper end 58d of a rod 62d having a longitudinal axis 66d, an arcuate friction plate 74d, a compression spring 90d coupled to the rod 62d, and a brake member 78d coupled to a lower end 82d of the rod 62d. The bevel angle lock and detent system 34d also includes a detent 118d (e.g., a detent finger) coupled to the rod 62d and having a tip 126d receivable in a recess 122d in a detent plate 150d, which is separate from the arcuate friction plate 74d and fixedly coupled to the bevel arm mount 36. The detent 118d is biased toward the detent plate 150d by a spring (148d) and positioned between the friction plate 74d and the handle 42d along the longitudinal axis 66d of the rod 62d. In the illustrated embodiment, the combination of at least the brake member 78d, the rod 62d, and the detent 118d can be referred to as one locking unit, and the combination of at least the arcuate friction plate 74d and the plurality of apertures 122d can be referred to as another locking unit.

When in the fully locked state (FIG. 8), the brake member 78d engages the arcuate friction plate 74d to apply a clamping force to the friction plate 74d. The spring 148d also biases the detent 118d toward the detent plate 150d for the tip 126d to engage a lower surface of the detent plate 150d or to be received in one of the recesses 122d (if the tip 126d aligns with one of the recesses 122d).

When in the unlocked state (not shown), the brake member 78d disengages the arcuate friction plate 74d. But, the detent 118d is still biased into engagement with the detent plate 150d for the tip 126d to be received in any of the recesses 122d in the detent plate 150d, allowing the bevel angle of the bevel arm 30 to be adjusted between commonly used bevel angle positions. Once the desired bevel angle is reached that corresponds to the detent 118d being located within one of the detent apertures 122d, the saw unit 22 can be locked at the desired bevel angle by rotating the handle 42d back into the position illustrated in FIG. 8 for the brake member 78d to engage the arcuate friction plate 74d.

When in the bevel angle detent override state (not shown), the brake member 78d remains disengaged from the arcuate friction plate 74d. The rod 62d is displaced by the handle 42d to also displace the detent 118d downward to an extent where the detent 118d is removed from and no longer is capable of being received in the recesses 122d, allowing the bevel arm 30 to be freely adjusted without stopping at any of the common bevel angles associated with the apertures 122d.

Various features of the invention are set forth in the following claims.

What is claimed is:

1. A miter saw comprising:
   a turntable;
   a bevel arm pivotably coupled to the turntable about a bevel axis;
   a saw unit supported by the bevel arm; and
   a bevel angle lock and detent system for holding the saw unit in a desired bevel angle relative to the turntable, the bevel angle lock and detent system including
      a first locking unit fixed relative to the turntable, the first locking unit having an arcuate surface and a plurality of detent apertures, each of the detent apertures corresponding to a predetermined bevel angle of the saw unit about the bevel axis,
      a second locking unit coupled to the bevel arm, the second locking unit having a brake member, a detent member, and a shaft, and
      an actuator coupled to the bevel arm and engageable with the shaft, the actuator moveable between a first position and a second position to move the second locking unit relative to the first locking unit;
   wherein in the first position of the actuator, the brake member is engaged with the arcuate surface of the first locking unit to lock the saw unit relative to the turntable and prevent the saw unit from pivoting about the bevel axis, and wherein in the second position of the actuator, the brake member is disengaged from the arcuate surface, thereby permitting pivoting movement of the saw unit about the bevel axis, and the detent member is engageable with one of the detent apertures to locate the saw unit relative to the turntable at one of the predetermined bevel angles.

2. The miter saw of claim 1, wherein the detent member is biased into engagement with a portion of the first locking unit when the actuator is in the first position.

3. The miter saw of claim 2, wherein the actuator is moveable to a third position in which the brake member and the detent member are disengaged from the first locking unit to permit movement of the saw unit relative to the turntable about the bevel axis while bypassing the detent apertures.

4. The miter saw of claim 3, wherein the actuator is pivotably coupled to the bevel arm about an axis transverse to the bevel axis, and wherein the actuator includes a cam that engages an end of the shaft to move the brake member when the actuator is moved between the first, second, and third positions.

5. The miter saw of claim 1, wherein the shaft is coupled to an anti-rotation member that is received within a channel of the bevel arm such that the anti-rotation member inhibits rotation of the brake member about a longitudinal axis of the shaft.

6. The miter saw of claim 1, wherein the detent member is a ball detent coupled to the brake member, and wherein the ball detent is biased into a portion of the first locking unit by a biasing member positioned within an aperture of the brake member.

7. The miter saw of claim 6, wherein the first locking unit is formed as a single arcuate plate including the detent apertures and a slot that receives the shaft.

8. The miter saw of claim 1, wherein the detent member is coupled to the actuator by a cable and biased into engagement with a portion of the first locking unit, and wherein the brake member is coupled to the shaft.

9. The miter saw of claim 8, wherein upon movement of the actuator from the first position to the second position, the brake member moves in a first direction away from the actuator and the detent member moves in a second direction toward the actuator.

10. The miter saw of claim 9, wherein the detent member is a plunger axially moveable in a direction parallel to a longitudinal axis of the shaft.

11. The miter saw of claim 9, wherein the detent member is an arm pivotably biased about an axis.

12. The miter saw of claim 1, wherein the first locking unit includes an arcuate plate engageable by the brake member that is separate and distinct from a detent plate having the detent apertures.

13. The miter saw of claim 12, wherein the brake member and the detent member are coupled to the shaft, and wherein the detent member is biased into engagement with the detent plate when the actuator is in the first and second positions.

14. A miter saw comprising:
   a turntable;
   a bevel arm pivotably coupled to the turntable about a bevel axis;
   a saw unit supported by the bevel arm; and
   a bevel angle lock and detent system for holding the saw unit in a desired bevel angle relative to the turntable, the bevel angle lock and detent system including
      a friction plate fixed relative to the turntable, the friction plate having an arcuate surface and a plurality of detent apertures, each of the detent apertures corresponding to a predetermined bevel angle of the saw unit about the bevel axis,
      a locking unit coupled to the bevel arm, the locking unit having a brake member, a detent member, and a shaft, and
      an actuator coupled to the bevel arm and engageable with the shaft, the actuator moveable between a first position and a second position to move the locking unit relative to the friction plate;
   wherein in the first position of the actuator, the brake member is engaged with the arcuate surface of the friction plate to lock the saw unit relative to the turntable and prevent the saw unit from pivoting about the bevel axis, and wherein in the second position of the actuator, the brake member is disengaged from the arcuate surface, thereby permitting pivoting movement of the saw unit about the bevel axis, and the detent member is engageable with one of the detent apertures to locate the saw unit relative to the turntable at one of the predetermined bevel angles.

15. The miter saw of claim 14, wherein the detent member is coupled to the actuator by a cable and biased into engagement with a portion of the friction plate, and wherein the brake member is coupled to the shaft.

16. The miter saw of claim 15, wherein upon movement of the actuator from the first position to the second position, the brake member moves in a first direction away from the actuator and the detent member moves in a second direction toward the actuator.

17. The miter saw of claim 16, wherein the detent member is a plunger axially moveable in a direction parallel to a longitudinal axis of the shaft.

18. The miter saw of claim 16, wherein the detent member is an arm pivotably biased about an axis.

\* \* \* \* \*